United States Patent
Hidaka

(10) Patent No.: US 12,420,775 B2
(45) Date of Patent: Sep. 23, 2025

(54) PARKING ASSIST SYSTEM

(71) Applicant: DENSO CORPORATION, Kariya (JP)

(72) Inventor: Takamasa Hidaka, Kariya (JP)

(73) Assignee: DENSO CORPORATION, Kariya (JP)

(*) Notice: Subject to any disclaimer, the term of this patent is extended or adjusted under 35 U.S.C. 154(b) by 309 days.

(21) Appl. No.: 17/575,152

(22) Filed: Jan. 13, 2022

(65) Prior Publication Data

US 2022/0135024 A1 May 5, 2022

Related U.S. Application Data

(63) Continuation of application No. PCT/JP2020/027275, filed on Jul. 13, 2020.

(30) Foreign Application Priority Data

Jul. 19, 2019 (JP) .................... 2019-133832

(51) Int. Cl.
*B60W 30/06* (2006.01)
*B60W 60/00* (2020.01)

(52) U.S. Cl.
CPC ........ *B60W 30/06* (2013.01); *B60W 60/0025* (2020.02); *B60W 2554/4041* (2020.02); *B60W 2554/80* (2020.02); *B60W 2556/45* (2020.02)

(58) Field of Classification Search
CPC .............. B62D 15/0285; B60W 30/06; B60W 2556/45; B60W 2556/50; B60W 2420/42;
(Continued)

(56) References Cited

U.S. PATENT DOCUMENTS

| | | | |
|---|---|---|---|
| 11,815,887 B2* | 11/2023 | Tamori | B62D 15/0285 |
| 2013/0151036 A1* | 6/2013 | Harumoto | G07C 9/00309 |
| | | | 701/2 |
| 2017/0144654 A1* | 5/2017 | Sham | G08G 1/148 |
| 2018/0046198 A1* | 2/2018 | Nordbruch | G05D 1/0282 |

(Continued)

FOREIGN PATENT DOCUMENTS

| | | |
|---|---|---|
| JP | 2008-015839 A | 1/2008 |
| JP | 2011054116 A | 3/2011 |

(Continued)

*Primary Examiner* — Hunter B Lonsberry
*Assistant Examiner* — Henry R Hinton
(74) *Attorney, Agent, or Firm* — Harness, Dickey & Pierce, P.L.C.

(57) ABSTRACT

A parking assist system includes: a self-driving vehicle that performs automatic driving from a getting-off area to a parking location in a parking area; an administrator device that transmits a guidance route to the parking location and a parking start instruction to the self-driving vehicle; and a mobile terminal device that communicates with the administrator device. The administrator device includes: a location information acquisition unit configured to acquire an object location indicative of a location of the self-driving vehicle or the mobile terminal device; a location determination unit configured to determine whether the object location is within a specified area; and a driving setting unit configured to: instruct the self-driving vehicle to start parking when the object location is within the specified area; and not to instruct the self-driving vehicle to start parking when the object location is not within the specified area.

20 Claims, 6 Drawing Sheets

(58) Field of Classification Search
CPC ....... B60W 2540/00; B60W 2540/049; B60W 2756/10; B60W 60/0025; B60W 60/0051; B60W 2554/4041; B60W 2554/80; G08G 1/146; G08G 1/143; G08G 1/148; G08G 1/144; G08G 1/096822; G08G 1/14; G08G 1/096725; G08G 1/096844; G08G 1/123; G08G 1/127; G08G 1/133; G08G 1/142; G08G 1/147; G05D 2201/0213; G05D 1/0088; G05D 1/0011; G05D 1/0276; G05D 1/028; G05D 1/0282; G05D 1/021; G05D 1/0212; G01C 21/3685; B60R 25/20; B60R 25/2036; G06Q 10/02; G06Q 20/127; G06Q 20/24; G06Q 2240/00; G06Q 30/0284; G06Q 50/30

See application file for complete search history.

(56) References Cited

U.S. PATENT DOCUMENTS

| | | | |
|---|---|---|---|
| 2019/0225209 A1* | 7/2019 | Seki | B60H 1/00878 |
| 2019/0308616 A1* | 10/2019 | Jie | B60W 10/06 |
| 2020/0130676 A1* | 4/2020 | Smid | B60W 30/06 |
| 2020/0150657 A1* | 5/2020 | Yoo | B60W 30/06 |
| 2020/0207334 A1* | 7/2020 | Cho | G08G 1/168 |
| 2020/0210731 A1* | 7/2020 | Yamanaka | G06V 20/59 |
| 2021/0180954 A1* | 6/2021 | Hiyokawa | G06V 20/586 |

FOREIGN PATENT DOCUMENTS

| | | | |
|---|---|---|---|
| JP | 2018065488 A | * | 4/2018 |
| JP | 2019061418 A | | 4/2019 |
| WO | WO-2018083799 A1 | | 5/2018 |

* cited by examiner

PARKING ASSIST SYSTEM

CROSS REFERENCE TO RELATED APPLICATIONS

This application is a continuation application of International Patent Application No. PCT/JP2020/027275 filed on Jul. 13, 2020, which designated the U.S. and claims the benefit of priority from Japanese Patent Application No. 2019-133832 filed on Jul. 19, 2019. The entire disclosure of all of the above application is incorporated herein by reference.

TECHNICAL FIELD

The present disclosure relates to a parking assist system configured to assist vehicle parking.

BACKGROUND ART

Regarding such a parking assist system, technologies are known, which make it possible to guide a self-driving vehicle to a parking location according to commands transmitted from an administrator device on the parking area side. For example, when a user operates a terminal device installed in a parking area, a self-driving vehicle is caused to start driving to move from a getting-off area where vehicle occupants get off to a parking location in a parking area.

SUMMARY

One aspect of the present disclosure is a parking assist system configured to assist vehicle parking. The system includes: a self-driving vehicle configured to perform automatic driving from a getting-off area to a parking location in a parking area; an administrator device configured to transmit a guidance route to the parking location and a parking start instruction to the self-driving vehicle; and a mobile terminal device held by a user of the self-driving vehicle and configured to communicate with the administrator device. The administrator device includes: a location information acquisition unit configured to acquire an object location indicative of a location of the self-driving vehicle or the mobile terminal device when the user performs an input operation via the mobile terminal device to start parking; a location determination unit configured to determine whether the object location is within a specified area; and a driving setting unit configured to: instruct the self-driving vehicle to start parking when the object location is within the specified area; and not to instruct the self-driving vehicle to start parking when the object location is not within the specified area.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
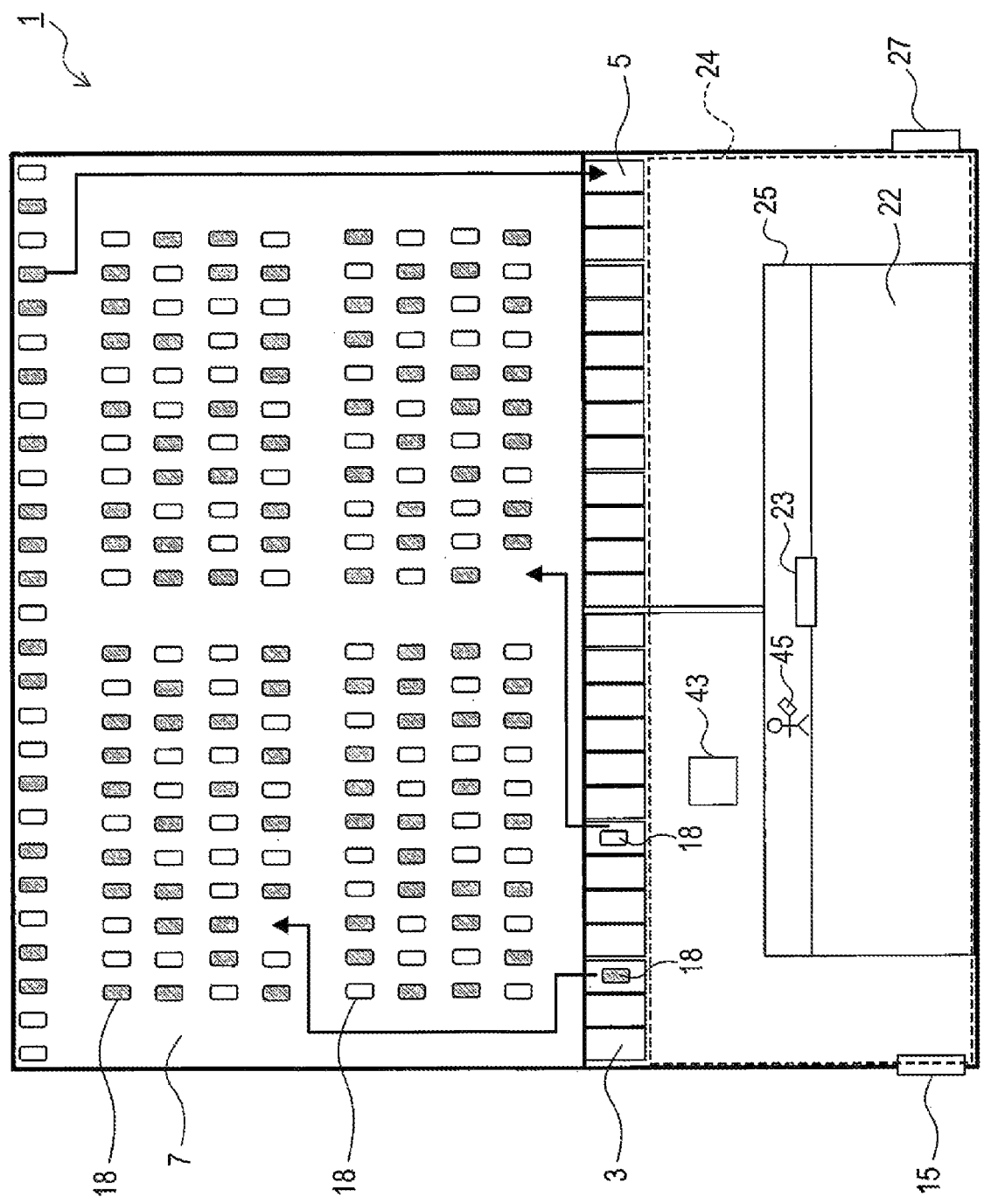
FIG. 1 is a schematic plan view showing a whole of a parking assist system.

To begin with, a relevant technology will be described only for understanding the following embodiments.

As a result of detailed studies conducted by the inventors, a problem has been found that it when a self-driving vehicle is driven to a parking location, there are people such as users and passers-by around the vehicle, the safety of such people might be impaired.

An aspect of this disclosure is to better ensure, in a parking assist system configured to assist vehicle parking, the safety of people such as users and passers-by around self-driving vehicles being driven to parking locations.

As described above, the one aspect of the present disclosure is a parking assist system configured to assist vehicle parking. The system includes: a self-driving vehicle configured to perform automatic driving from a getting-off area to a parking location in a parking area; an administrator device configured to transmit a guidance route to the parking location and a parking start instruction to the self-driving vehicle; and a mobile terminal device held by a user of the self-driving vehicle and configured to communicate with the administrator device. The administrator device includes: a location information acquisition unit configured to acquire an object location indicative of a location of the self-driving vehicle or the mobile terminal device when the user performs an input operation via the mobile terminal device to start parking; a location determination unit configured to determine whether the object location is within a specified area; and a driving setting unit configured to: instruct the self-driving vehicle to start parking when the object location is within the specified area; and not to instruct the self-driving vehicle to start parking when the object location is not within the specified area.

According to another aspect of the present disclosure is a parking assist system configured to assist vehicle parking. The system includes: a self-driving vehicle configured to perform automatic driving from a getting-off area to a parking location in a parking area; an administrator device configured to transmit a guidance route to the parking location and a parking start instruction to the self-driving vehicle; and a mobile terminal device held by a user of the self-driving vehicle and configured to communicate with the administrator device. The administrator device includes a computer programmed to: acquire an object location indicative of a location of the self-driving vehicle or the mobile terminal device when the user performs an input operation via the mobile terminal device to start parking; determine whether the object location is within a specified area; and instruct the self-driving vehicle to start parking when the object location is within the specified area; and not to instruct the self-driving vehicle to start parking when the object location is not within the specified area.

According to the parking assist system as described above, a self-driving vehicle can start parking only when the object location is within a specified area. The specified area can be provided such that passers-by and the self-driving vehicle cannot easily come close to each other or such that the user is kept sufficiently away from the self-driving vehicle. In this way, the safety of people around the self-driving vehicle can be better ensured.

Next, a plurality of embodiments of this disclosure will be described with reference to drawings.

1. Embodiment

1-1. Configuration of Parking Assist System

The configuration of a parking assist system 1 will be described based on FIG. 1 to FIG. 3. As shown in FIG. 1, the parking assist system 1 includes an incoming vehicle room 3 provided in a getting-off area where users get out of their vehicles, an outgoing vehicle room 5 provided in a riding area where users ride on their vehicles, and a parking area 7. In the following, the area including the incoming vehicle room 3, the outgoing vehicle room 5, and the parking area 7 may also be referred to as 'the parking facility.

The incoming vehicle room 3 and the outgoing vehicle room 5 each include plural divisions. The incoming vehicle room 3 is connected to the outside of the parking assist system 1 via an entrance 15. Self-driving vehicles 18 can enter the incoming vehicle room 3 from outside through the entrance 15. The self-driving vehicles 18 are each provided with an automated valet parking function.

The self-driving vehicles 18 are required to be capable of performing the automated valet parking function and do not need to have a function for self-driving outside the parking facility. The automated valet parking function provided for each self-driving vehicle 18 includes a function for self-driving from the incoming vehicle room 3 to a parking location in the parking area 7 and parking there and a function for self-driving from a parking location in the parking area 7 to the outgoing vehicle room 5.

The automated valet parking function particularly includes a function for repeatedly acquiring location information on the self-driving vehicle 18 and transmitting the information to an administrator device 39 and a function for receiving guidance route information from the administrator device 39 and controlling the self-driving vehicle 18 to run along the guidance route. The location information on the self-driving vehicle 18 represents an estimated current location of the self-driving vehicle 18 and, may include, for example, coordinate values in the area of the parking facility.

The incoming vehicle room 3 and the outgoing vehicle room 5 are adjacent to an entrance 23 of facilities 22 including stores. Occupants of the self-driving vehicle 18 having entered the incoming vehicle room 3 can get out of the self-driving vehicle 18 and walk to the entrance 23.

The outgoing vehicle room 5 is connected to the outside of the parking assist system 1 via an exit 27. The self-driving vehicle 18 can proceed to the outside of the parking assist system 1 from the outgoing vehicle room 5 through the exit 27. The outgoing vehicle room 5 is adjacent to the entrance 23. People to be vehicle occupants can walk from the entrance 23 to the outgoing vehicle room 5.

The parking area 7 allows parking of plural self-driving vehicles 18. The parking area 7 includes plural divisions. Each division provided in the incoming vehicle room 3, outgoing vehicle room 5, and parking area 7 is an area where one self-driving vehicle 18 can be parked.

Each self-driving vehicle 18 can run from the incoming vehicle room 3 to the parking area 7 and from the parking area 7 to the outgoing vehicle room 5.

Figure 2:
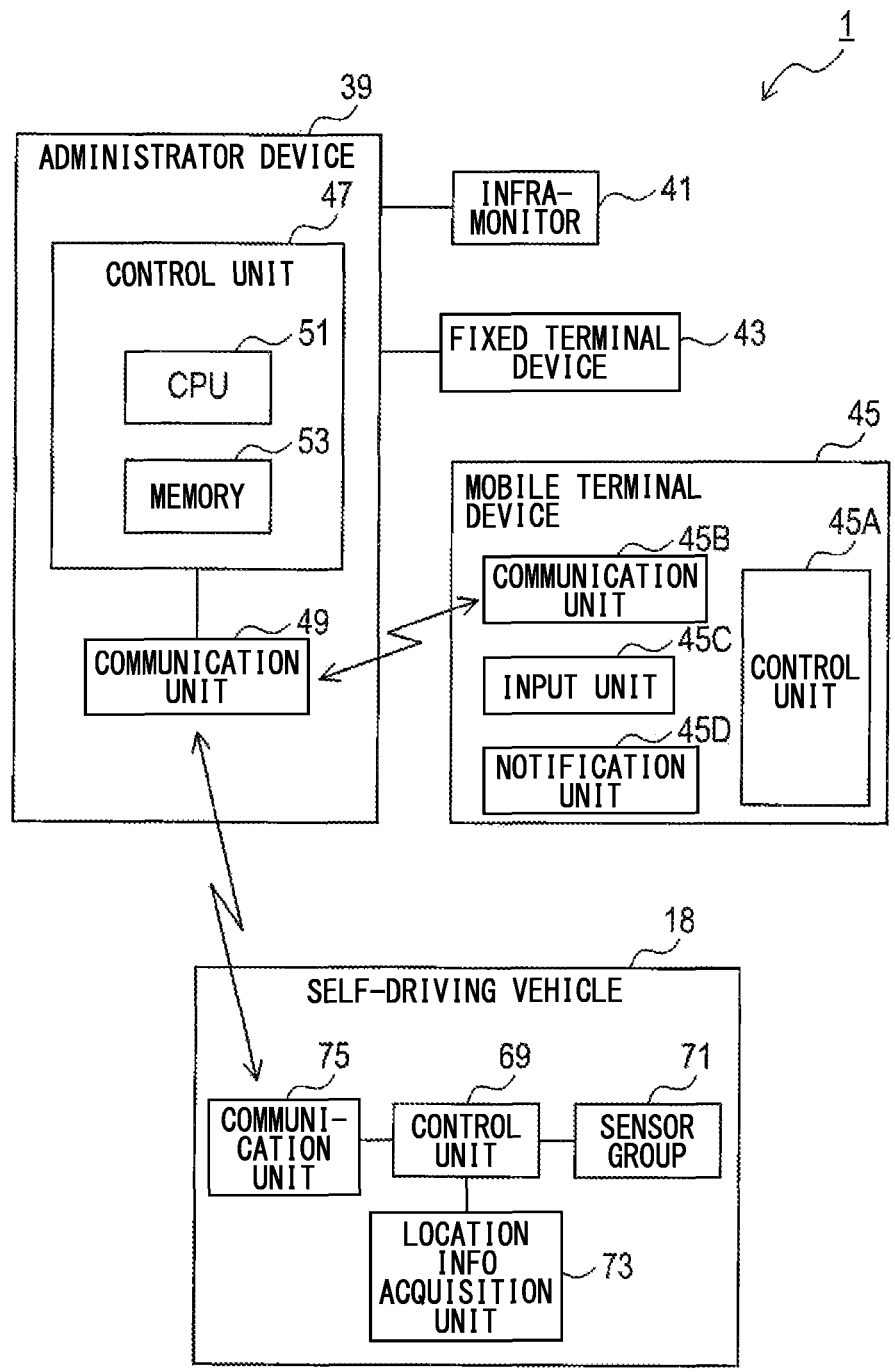
FIG. 2 is a block diagram showing a configuration of the parking assist system.

As shown in FIG. 2, the parking assist system 1 includes the administrator device 39, infra-monitors 41, a fixed terminal device 43, and a mobile terminal device 45.

The administrator device 39 includes a control unit 47 and a communication unit 49. The control unit 47 includes a microcomputer provided with a CPU 51 and a semiconductor memory, for example, a RAM or a ROM, (hereinafter referred to as a 'memory 53).

The functions of the control unit 47 are realized by having programs stored in a non-transitory substantial recording medium executed by the CPU 51. In the present example, the memory 53 is the non-transitory substantial recording medium holding programs. When the programs are executed, the methods corresponding to the programs are executed. The control unit 47 may be provided with one or more microcomputers.

Figure 3:
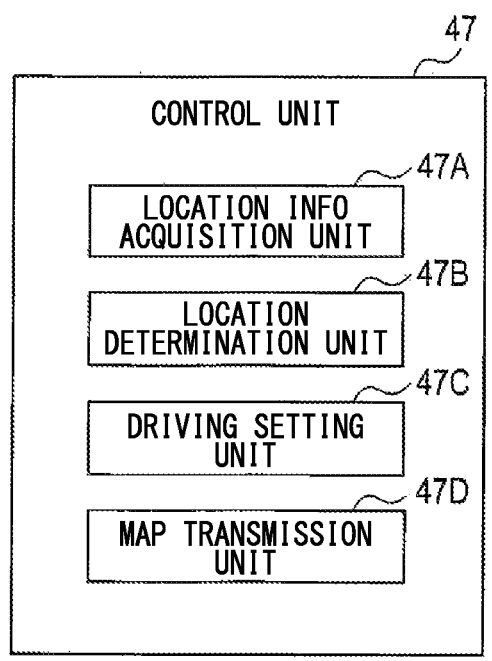
FIG. 3 is a block diagram showing a configuration of a control unit of a administrator device.

The control unit 47 is configured to transmit information on a guidance route leading to a parking location and an instruction for starting parking to the self-driving vehicle 18 and includes, for example, as shown in FIG. 3, a location information acquisition unit 47A, a location determination unit 47B, a driving setting unit 47C, and a map transmission unit 47D. The operations of the units 47A to 47D included in the control unit 47 will be described later.

The memory 53 stores map information on the parking facility. The map information includes information representing the states of the divisions of the parking area 7. The divisions are each either unoccupied (hereinafter referred to as a 'vacant state) or occupied by a self-driving vehicle 18 (hereinafter referred to as an 'occupied state). The communication unit 49 can communicate with the self-driving vehicle 18.

The infra-monitors 41 include devices for acquiring information representing internal conditions of the parking assist system 1 (hereinafter referred to as 'parking area interior information) and supplying the acquired parking area interior information to the administrator device 39. Note that the interior of the parking assist system 1 includes the incoming vehicle room 3 and the outgoing vehicle room 5. The infra-monitors 41 include, in addition to cameras and LIDARs for taking images of the interior of the parking assist system 1, ultrasonic sensors and optical sensors using infrared rays with a detection range covering the interior of the parking assist system 1.

The parking area interior information includes, for example, information indicating where obstacles are located, information representing states of the divisions of the parking area 7, and information on locations of self-driving vehicles 18 in the parking assist system 1.

The fixed terminal device 43 is, as shown in FIG. 1, installed near the incoming vehicle room 3. The fixed terminal device 43 accepts input operations by vehicle occupants. The fixed terminal device 43 outputs signals corresponding to input operations performed to the administrator device 39.

The fixed terminal device 43, for example, outputs, according to an input operation performed, a parking request signal. A parking request signal is a signal to request driving a self-driving vehicle 18 located in the incoming vehicle room 3 to the parking area 7 and parking the vehicle there. Also, the fixed terminal device 43, when outputting a signal corresponding to an input operation performed to the administrator device 39, outputs identification information of the self-driving vehicle 18.

The fixed terminal device 43, for example, outputs, according to an input operation performed, a leaving request signal. The leaving request signal is a signal to request driving a self-driving vehicle 18 parked in the parking area 7 to the outgoing vehicle room 5. Also, the fixed terminal device 43 outputs, according to an input operation performed, identification information of the self-driving vehicle 18. The identification information is, for example, license plate information for uniquely identifying the self-driving vehicle 18.

The mobile terminal device 45 includes a control unit 45A, a communication unit 45B, an input unit 45C, and an announcement unit 45D. The mobile terminal device 45 is a device to be held by an occupant of each self-driving vehicle 18 and is configured to be capable of communicating with the administrator device 39. The mobile terminal device 45 is configured, for example, as a smartphone. In the mobile terminal device 45, the control unit 45A executes functions similar to those of the foregoing fixed terminal device 43. Namely, the mobile terminal device 45 is provided with a function for outputting, according to an input operation to the input unit 45C, a parking request signal from the control unit 45A and a function for outputting, according to an input operation to the input unit 45C, a leaving request signal from the control unit 45A.

In particular, the mobile terminal device 45, when transmitting a parking request signal or a leaving request signal to the administrator device 39, acquires, using a well-known positioning system, location information on the mobile terminal device 45 and transmits the location information on the mobile terminal device 45 to the administrator device 39. For example, the mobile terminal device 45 is provided with a circuit to receive GNSS (Global Navigation Satellite System) signals and acquires location information based on the received GNSS signals.

The announcement unit 45D is configured including a display and a speaker, and makes announcements to vehicle occupants using images or voice.

Figure 4:
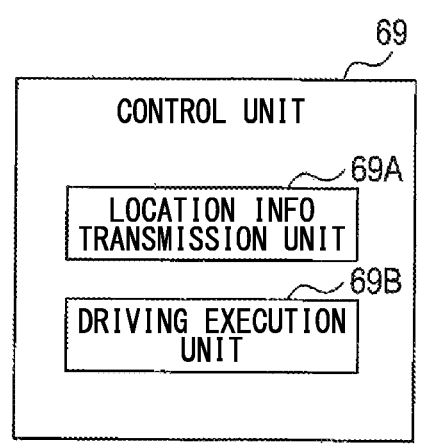
FIG. 4 is a block diagram showing a configuration of a control unit of a vehicle.

The self-driving vehicle 18 is, as described above, provided with the automated valet parking function. As shown in FIG. 2, the self-driving vehicle 18 is provided with a control unit 69, a sensor group 71, a location information acquisition unit 73, and a communication unit 75. The control unit 69 is provided, as shown in FIG. 4, with a location information transmission unit 69A and a driving execution unit 69B. Operations of these units 69A and 69B included in the control unit 69 will be described later.

The control unit 69 controls each unit of the self-driving vehicle 18. Self-driving functions are realized by control performed by the control unit 69. The self-driving vehicle 18 acquires, from the administrator device 39, map information on the parking facility and guidance route information, and, when performing self-driving, uses the parking facility map information and the guidance route information.

The sensor group 71 acquires periphery information representing peripheral conditions of the self-driving vehicle 18. The periphery information represents, for example, the locations of obstacles around the self-driving vehicle 18. The sensor group 71 includes, for example, cameras and LIDARs. The self-driving vehicle 18 uses the periphery information for automatic driving.

The location information acquisition unit 73 acquires location information on the self-driving vehicle 18. The location information acquisition unit 73 is, for example, a location estimation system using LIDARs and maps. The self-driving vehicle 18 uses the location information on the vehicle for automatic driving. The communication unit 75 can communicate with the administrator device 39.

The communication unit 75 of the self-driving vehicle 18 and the communication unit 45B of the mobile terminal device 45 may be configured to be capable of communication complying with a prescribed short-range wireless communication standard. In this case, location information on the mobile terminal device 45 may be transmitted to the administrator device 39 via the self-driving vehicle 18. To be specific, after the communication unit 75 and the communication unit 45B are paired, information on the location of the mobile terminal device 45 may be transmitted to the self-driving vehicle 18 via the communication unit 45B. The self-driving vehicle 18 may transmit information on the location of the mobile terminal device 45 to the administrator device 39. The prescribed short-range radio communication standard is, for example, a communication standard for communications with a line-of-sight distance of 5 m or more (for example, 10 m). For example, Bluetooth Low Energy (Bluetooth is a registered trademark), Wi-Fi (registered trademark), and ZigBee (registered trademark) may be adopted.

1-2. Processing 1-2-1. Processing Executed by Administrator Device 39

Figure 5:
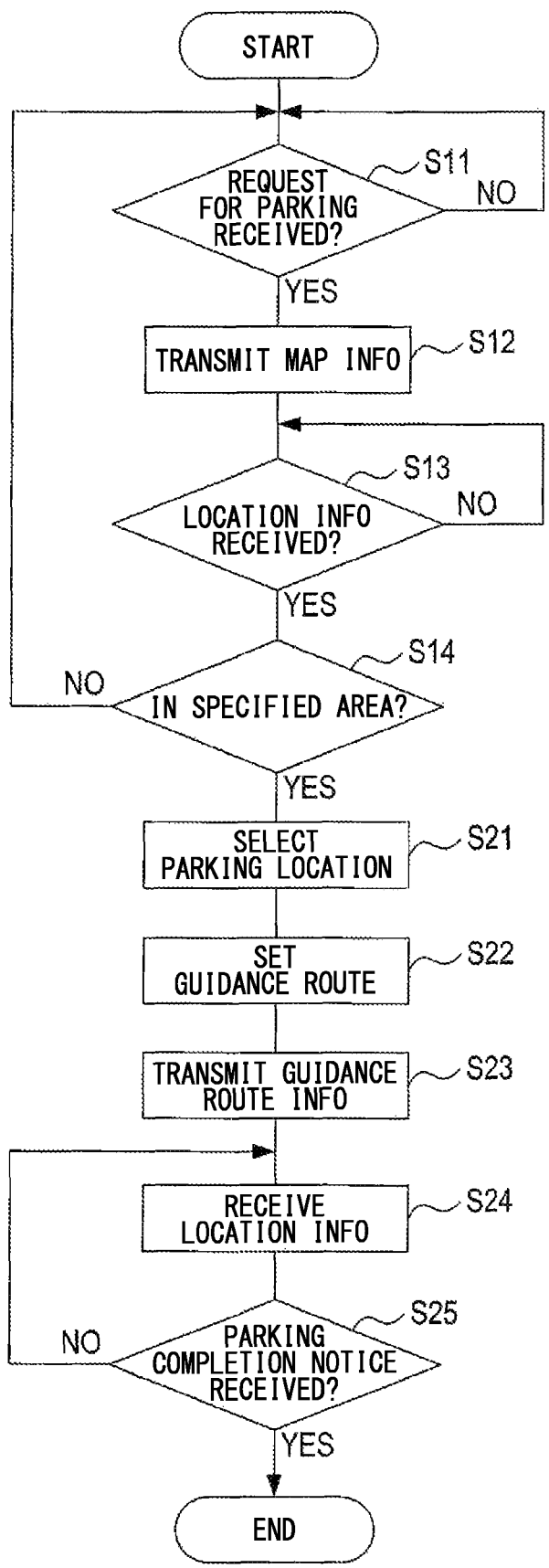
FIG. 5 is a flowchart of a parking setting process.

Parking setting processing executed by the administrator device 39 will be described with reference to FIG. 5. The parking setting processing is started, for example, when the administrator device 39 is powered on and is, subsequently, executed repeatedly.

The location information acquisition unit 47A of the administrator device 39 determines, in step (herein after referred to as 'S ') 11 of the parking setting processing represented in FIG. 5, whether or not a parking request signal has been received.

When the user inputs a parking request by operating the fixed terminal device 43 or the mobile terminal device 45, the fixed terminal device 43 or the mobile terminal device 45 transmits a parking request signal corresponding to the input to the administrator device 39. At this time, the user inputs, to the fixed terminal device 43 or the mobile terminal device 45, vehicle identifying information, for example, license plate information, user identifying information, for example, a user ID and a password, and other required information.

In cases where the fixed terminal device 43 has been operated, for example, information like an ID for uniquely identifying the fixed terminal device 43, vehicle information, and user information are transmitted to the administrator device 39. In cases where the mobile terminal device 45 has been operated, for example, information like an ID for uniquely identifying the mobile terminal device 45, location information on the mobile terminal device 45, vehicle information, and user information are transmitted to the administrator device 39. After performing the operation for a parking request, the user can leave the parking facility to head for his/her destination.

Subsequently, the map transmission unit 47D of the administrator device 39 transmits, in S12, map information on the parking facility to the self-driving vehicle 18. That is, the map transmission unit 47D transmits the map information on the parking facility to the self-driving vehicle 18 when the user performs, using the fixed terminal device 43 or the mobile terminal device 45, an input operation to notify of a start of parking.

The self-driving vehicle 18 is, as being described later, set to transmit location information on the vehicle when the map information is received. Hence, in S13, the location information acquisition unit 47A of the administrator device 39 determines whether or not the location information has been received. When, in S13, it is determined that the location information has not been received, execution of S13 is repeated. In this way, the location information acquisition unit 47A acquires the location information transmitted from the self-driving vehicle 18.

When, in S13, it is determined that the location information has been received, processing advances to S14 where the location determination unit 47B of the administrator device 39 determines whether or not the fixed terminal device 43 or the mobile terminal device 45 that the user used in performing operation fora parking request and the self-driving vehicle 18 are each located in a specified area.

At this time, as to the self-driving vehicle 18, the location determination unit 47B determines whether or not the vehicle is located in the incoming vehicle room 3. This is to make sure that the self-driving vehicle 18 is stopped in a safe location and allow a guidance route to be set with a small error.

In cases where the mobile terminal device 45 has been operated, the location determination unit 47B determines whether or not the user carrying the mobile terminal device 45 is present in a prescribed waiting area 24 shown in FIG. 1. The prescribed waiting area 24 is outside the incoming vehicle room 3 and the outgoing vehicle room 5 and is closer to the facilities 22 than the incoming vehicle room 3 and the outgoing vehicle room 5. The waiting area 24 may be, as shown in FIG. 1, provided as a pedestrian-only area 25 where vehicles are prohibited from running.

This is to ensure user safety by preventing the user from coming into contact with self-driving vehicles 18 running in an unmanned state. The waiting area 24 may be provided either inside or outside the facilities 22, and it is advisable to make the area a pedestrian only area so as to also prevent the user from coming into contact with self-driving vehicles 18 running in a manned-state. In cases where the fixed terminal device 43 has been operated and an identification ID of the fixed terminal device 43 has been received, the fixed terminal device 43 is determined to be located in a specified area. In the parking assist system 1, the waiting area 24 and the getting-off area are provided to be apart from each other by a predetermined distance.

When, in S14, at least one of the fixed terminal device 43 or mobile terminal device 45 operated by the user and the self-driving vehicle 18 is determined, by the location determination unit 47B, to be located outside the corresponding specified area, processing returns to S11. Also in S14, when both the fixed terminal device 43 or mobile terminal device 45 operated by the user and the self-driving vehicle 18 are determined to be located in the respective specified areas, processing advances to S21 where the driving setting unit 47C of the administrator device 39 selects a parking location.

As the parking location, a vacant division in the parking area 7 is selected. The driving setting unit 47C determines the state of each division, for example, as follows. When parking at a division, the self-driving vehicle 18 transmits identification information of the division and parking-start information to the administrator device 39. When leaving the division where the self-driving vehicle 18 has been parked, the vehicle transmits the division identification information and parking-end information to the administrator device 39.

The driving setting unit 47C determines the states of respective divisions based on the history of information received from respective self-driving vehicles 18. The driving setting unit 47C may also determine the states of the respective divisions based on information supplied by the infra-monitors 41.

When there is only one division left vacant, the driving setting unit 47C selects the division as the parking location. When there are plural vacant divisions, the driving setting unit 47C selects one of the vacant divisions as the parking location based on a predetermined criterion. The criterion may be, for example, selecting the division nearest to the incoming vehicle room 3, selecting the division nearest to the outgoing vehicle room 5, or selecting a division in an area where many divisions are left vacant.

In S22, the driving setting unit 47C sets, using map information on the parking facility, a guidance route for guiding the self-driving vehicle 18 from the vehicles current location to the parking location selected in the foregoing S21.

In S23, the driving setting unit 47C transmits, using the communication unit 49, information representing the guidance route set in the foregoing S22 (hereinafter referred to as the 'guidance route information'). The guidance route information serves also as a parking start instruction to the self-driving vehicle 18. Namely, the driving setting unit 47C is configured to instruct, when the self-driving vehicle 18 and the mobile terminal device 45 are located in the respective specified areas, the self-driving vehicle 18 to start parking. Also, the driving setting unit 47C is configured not to instruct, when the self-driving vehicle 18 and the mobile terminal device 45 are located outside the respective specified areas, the self-driving vehicle 18 to start parking.

As being described later, the self-driving vehicle 18 receives the guidance route information and starts automatic driving along the guidance route.

Subsequently, in S24, the location information acquisition unit 47A acquires the location information transmitted from the self-driving vehicle 18. In S25, the driving setting unit 47C determines whether or not the communication unit 49 has received a parking completion notice. The parking completion notice is a notice transmitted by the self-driving vehicle 18 when the vehicle is parked in the parking location at the end of the guidance route. When the parking completion notice has been received, the driving setting unit 47C ends this processing. When no parking completion notice has been received, processing returns to S24.

1-2-2. Automatic Parking Processing Executed by Self-Driving Vehicle 18

Figure 6:
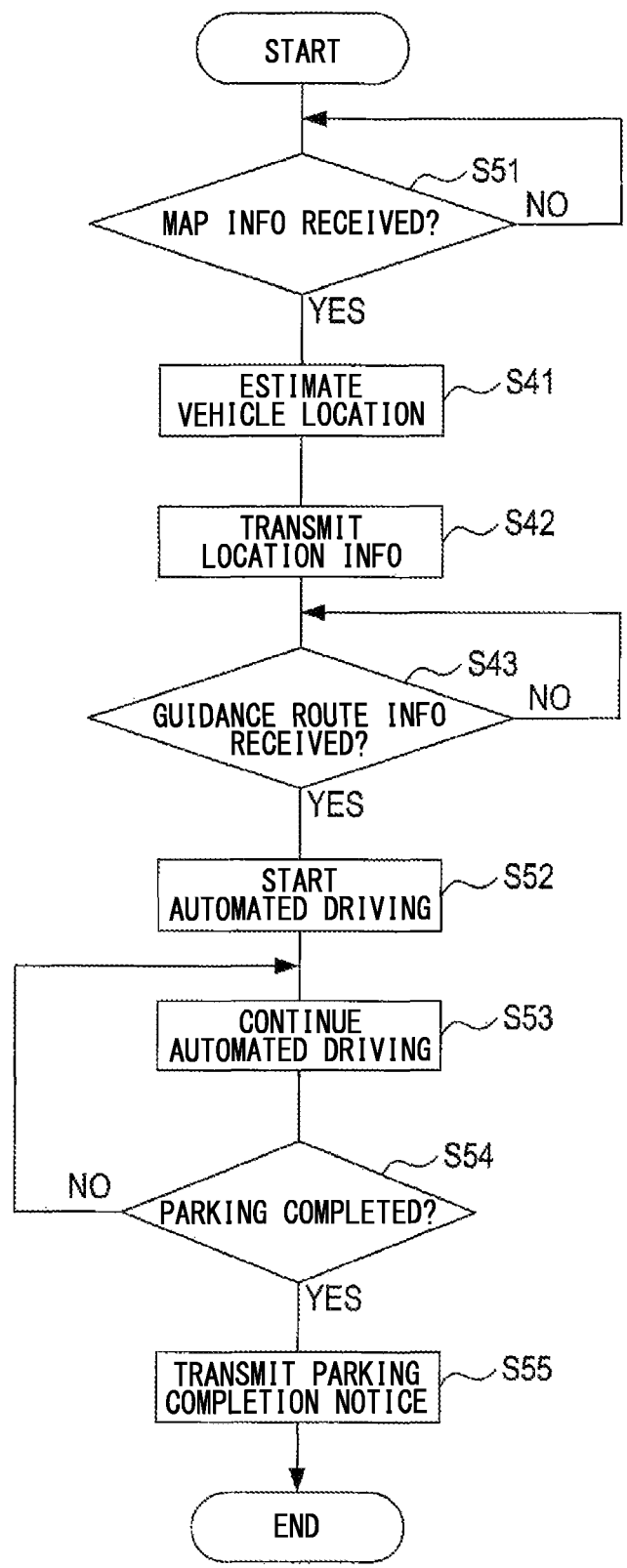
FIG. 6 is a flowchart of an automatic parking process.

Automatic parking processing executed by the self-driving vehicle 18 will be described with reference to FIG. 6. In the automatic parking processing, according to the parking setting processing executed by the administrator device 39, the self-driving vehicle 18 is automatically driven from the incoming vehicle room 3 to a parking location.

The location information transmission unit 69A of the control unit 69 determines, in S51, whether or not the communication unit 75 has received map information on the parking facility. When the map information has not been received, processing returns to S51.

When the map information is determined to have been received, processing advances to S41 where the location information transmission unit 69A estimates the current location of the self-driving vehicle 18. In S42, the location information transmission unit 69A transmits the result of estimating the current location to the administrator device 39 as location information on the self-driving vehicle 18.

Subsequently, in S43, the driving execution unit 69B of the control unit 69 determines whether or not guidance route information has been received. The guidance route information is to be transmitted by the administrator device 39. When, in S43, the guidance route information is determined not to have been received, the driving execution unit 69B repeats execution of S43. When, in S43, the guidance route information is determined to have been received, processing advances to S52 where the driving execution unit 69B starts automatic driving of the self-driving vehicle 18. In the automatic driving, the driving execution unit 69B drives the self-driving vehicle 18 along the route represented by the guidance route information.

In S53, the driving execution unit 69B continues automatically driving the self-driving vehicle 18. The driving execution unit 69B repeatedly transmits location information on the self-driving vehicle 18 until, in S54 being described later, parking is determined to have been completed. The location information transmitted is received by the administrator device 39.

Subsequently, in S54, the driving execution unit 69B determines whether or not parking has been completed. Parking is completed when the self-driving vehicle 18 is parked in the parking location selected by the administrator device 39. When parking is determined not to have been completed, the driving execution unit 69B repeats execution of S54.

When parking is determined to have been completed, processing advances to S55 where the driving execution unit 69B transmits a parking completion notice using the communication unit 75. The parking completion notice transmitted is received by the administrator device 39.

1-2-3. Example of Sequence

Figure 7:
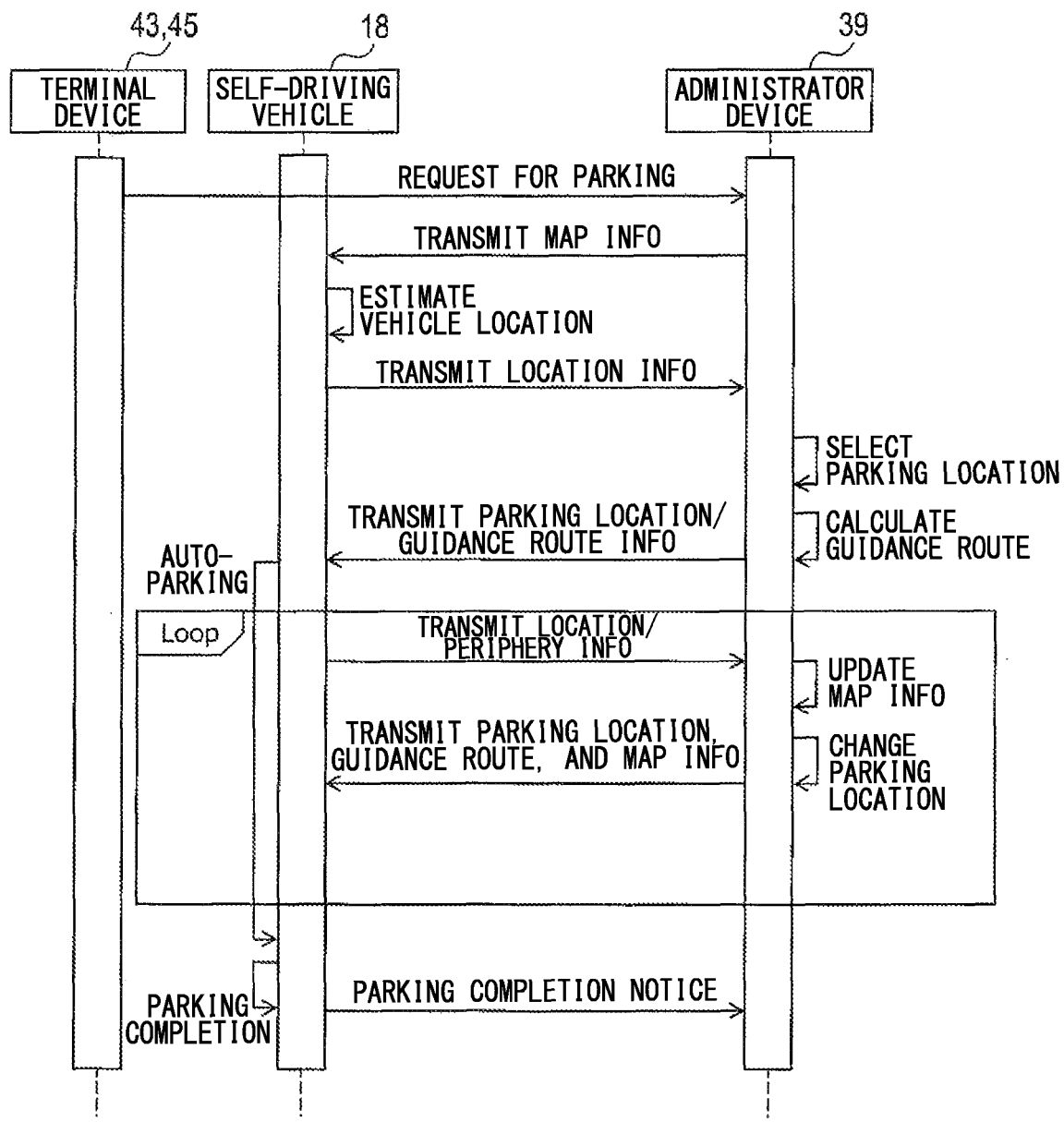
FIG. 7 shows an example of a sequence of execution of a parking setting process and an automatic parking process.

An example of a sequence executed by the terminal device, either the fixed terminal device 43 or the mobile terminal device 45, the administrator device 39, and the self-driving vehicle 18 is illustrated in FIG. 7. The sequence illustrated explicitly indicates that, when the user performs an input operation using a terminal device, for example, the mobile terminal device 45 to notify of a start of parking, the administrator device 39 transmits map information to the self-driving vehicle 18, that, when the self-driving vehicle 18 receives the map information from the administrator device 39, the self-driving vehicle 18 transmits location information on the vehicle to the administrator device 39, and that the administrator device 39 receives the location information transmitted from the self-driving vehicle 18.

1-3. Advantages

According to the embodiment described in detail above, the following advantages are obtained.

(1a) One aspect of this disclosure is the parking assist system 1 configured to assist vehicle parking. The parking assist system 1 includes the self-driving vehicle 18, the administrator device 39, and the mobile terminal device 45. The self-driving vehicle 18 is configured to be capable of automatic driving, in a parking area, from a getting-off area to a parking location. The administrator device 39 is configured to transmit information on a guidance route leading to the parking location and a parking start instruction to the self-driving vehicle 18. The mobile terminal device 45 is held by the user and is configured to be capable of communicating with the administrator device 39.

The administrator device 39 includes the location information acquisition unit 47A, the location determination unit 47B, and the driving setting unit 47C. The location information acquisition unit 47A is configured to acquire, when the user performs an input operation using the mobile terminal device 45 to notify of a start of parking, object location information representing the location of the self-driving vehicle 18 or the mobile terminal device 45. The location determination unit 47B is configured to determine whether or not the object location is in a specified area. The driving setting unit 47C is configured to instruct, when the object location is in the specified area, the self-driving vehicle 18 to start parking and not to instruct, when the object location is not in the specified area, the self-driving vehicle 18 to start parking.

According to the parking assist system 1 as described above, the self-driving vehicle 18 can be arranged to be allowed to start parking only when the object location is in a specified area. In doing so, the specified area can be provided such that passers-by and the self-driving vehicle 18 cannot easily approach each other or such that the user is sufficiently separated from the self-driving vehicle 18. In this way, the safety of people around the self-driving vehicle 18 can be further ensured. According to the parking assist system 1 as described above, the user can transmit a request for parking using the mobile terminal device 45, so that, compared with configurations where a request for parking can be transmitted only from the fixed terminal device 43, convenience is improved.

(1b) In one aspect of this disclosure, the location determination unit 47B at least determines whether or not the self-driving vehicle 18 is located in a getting-off area prescribed as an area where the user gets out of the vehicle.

According to the parking assist system 1 as described above, parking can be started when the self-driving vehicle 18 is located in the getting-off area.

(1c) In one aspect of this disclosure, the administrator device 39 is further provided with the map transmission unit 47D. The map transmission unit 47D is configured to transmit map information on a parking area to the self-driving vehicle 18. The self-driving vehicle 18 is further provided with the location information transmission unit 69A. The location information transmission unit 69A is configured to receive the map information from the administrator device 39 and to, subsequently, transmit location information on the self-driving vehicle 18 to the administrator device 39. The location information acquisition unit 47A of the administrator device 39 acquires the location information transmitted from the self-driving vehicle 18.

According to the parking assist system 1 as described above, the self-driving vehicle 18 can supply, using receiving of the map information from the administrator device 39 as a trigger, location information on the vehicle to the administrator device 39. This makes it unnecessary for the administrator device 39 to separately request the location information from the self-driving vehicle 18.

(1d) In one aspect of this disclosure, the map transmission unit 47D of the administrator device 39 is configured to transmit, when the user performs an input operation to notify of a start of parking using the mobile terminal 45, the map information to the self-driving vehicle 18.

According to the parking assist system 1 as described above, a configuration can be realized in which the administrator device 39 and the self-driving vehicle 18 start operation using the users input operation to notify of a start of parking as a trigger. Therefore, the administrator device 39 and the self-driving vehicle 18 can be prevented from performing unnecessary communication before the users input operation.

(1e) In one aspect of this disclosure, the location information acquisition unit 47A of the administrator device 39 is configured to acquire, as object location information, information on the locations of the self-driving vehicle 18 and mobile terminal device 45. The location determination unit 47B is configured to determine whether or not the self-driving vehicle 18 is located in a getting-off area and the mobile terminal device 45 is located in the waiting area 24 provided outside the getting off area.

According to the parking assist system 1 as described above, the self-driving vehicle 18 can be made to start parking when the vehicle is in the getting-off area and the mobile terminal device 45 is in the waiting are 24. Therefore, the self-driving vehicle 18 can be made to start parking when the self-driving vehicle 18 and the user are separated, so that safety is further enhanced.

(1f) In one aspect of this disclosure, the location information acquisition unit 47A is configured to further acquire, as object location information, information on the location of the self-driving vehicle 18 in response to a request made by the user for parking of the self-driving vehicle 18. The location determination unit 47B is configured to determine whether or not the self-driving vehicle 18 is located in a getting-off area and the mobile terminal device is located in the waiting area 24.

In the configuration as described above, before starting automatic driving of the self-driving vehicle 18, whether or not the self-driving vehicle 18 and the user are each located as prescribed, for example, in a safe area can be determined, so that automatic driving can be started further safely.

(1g) In one aspect of this disclosure, the operation setting unit 47C is configured to select, when the location determination unit 47B determines that the self-driving vehicle 18 is located in a getting-off area and that the mobile terminal device is located in the waiting area 24, a parking location for the self-driving vehicle 18 and instruct the self-driving vehicle 18 to start parking. Also, the driving setting unit 47C is configured not to instruct, when the location determination unit 47B determines that the self-driving vehicle 18 is not located in a getting-off area or that the mobile terminal device is located outside the waiting area 24, the self-driving vehicle 18 to start parking.

In the configuration as described above, whether or not to start automatic driving of the self-driving vehicle 18 can be determined depending on where the self-driving vehicle 18 and the user are located.

2. Other Embodiments

An embodiment of this disclosure has been described above, but this disclosure can be implemented in various modified forms without being limited to the above embodiment.

(2a) In the above embodiment, the driving setting unit 47C instructs the self-driving vehicle 18 to start parking when the self-driving vehicle 18 and the mobile terminal device 45 are each located in a specified area, but the procedure is not limited to the above. For example, the driving setting unit 47C may instruct the self-driving vehicle 18 to start parking, when one of the self-driving vehicle 18 and the mobile terminal device 45 is located in a specified area even with the other one not being located in any specified area.

(2b) In the above embodiment, the driving setting unit 47C is configured not to immediately instruct the self-driving vehicle 18 to start parking when either the self-driving vehicle 18 or the mobile terminal device 45 is not located in any specified area, but the configuration is not limited to this. For example, when the self-driving vehicle 18 is located in a specified area whereas the mobile terminal device 45 is not located in the prescribed waiting area 24, the driving setting unit 47C may transmit guidance route information after waiting until the mobile terminal device 45 is located in the prescribed waiting area 24.

To be concrete, when guidance route information is not received in S43, it is appropriate to return processing to S42 where location information is transmitted again by the location information transmission unit 69A of the self-driving vehicle 18.

When the determination made in S14 is negative, processing is returned to S12. In S12, the location information acquisition unit 47A of the administrator device 39 again requests the mobile terminal device 45 to transmit location information and, if necessary, also requests the self-driving vehicle 18 to transmit map information again. Namely, by requesting location information again, the location information acquisition unit 47A repeatedly acquires location information at least on the mobile terminal device 45. In S13, the location information acquisition unit 47A determines whether or not location information at least on the mobile terminal device 45 has been acquired.

The location determination unit 47B, in S14, repeats determining, based on the latest location information on the self-driving vehicle 18 and the mobile terminal device 45, whether or not the self-driving vehicle 18 is located in a getting-off area and the mobile terminal device 45 is located in the waiting area 24. Further, when the self-driving vehicle 18 is located in a getting-off area and the mobile terminal device is not located in the waiting area 24, the driving setting unit 47C waits until the mobile terminal device 45 is located in the waiting area 24. Subsequently, when the mobile terminal device 45 enters the waiting area 24, the driving setting unit 47C instructs, in S23, a start of parking. A configuration like this is appropriate.

In the configuration as described above, a start of parking can be instructed after waiting until the mobile terminal device 45 enters a safe area.

(2c) Plural functions of a single component in the above embodiment may be realized by plural components, and a single function of a single component may be realized by plural components. Also, plural functions of plural components may be realized by a single component, and a single function realized by plural components may be realized by a single component. Furthermore, a part of the configuration of the above embodiment may be omitted. Still furthermore, at least a part of the configuration of the above embodiment may be added to or may replace another configuration of the above embodiment.

(2d) Besides the parking assist system 1 described above, this disclosure can also be realized using, in various forms, components of the parking assist system 1 such as the administrator device 39 and the self-driving vehicle 18, programs used by such components of the parking assist system 1 to make computers function, non-transitory substantial recording media like semiconductor memories holding the programs, and parking assisting methods.

The invention claimed is:

1. A parking assist system configured to assist vehicle parking, the system comprising:
   a self-driving vehicle configured to perform automatic driving from a getting-off area in a parking area to a parking location in the parking area;
   an administrator device configured to transmit a guidance route from the getting-off area to the parking location and a parking start instruction to the self-driving vehicle; and
   a mobile terminal device configured to be held by a user of the self-driving vehicle and configured to communicate with the administrator device, wherein
   the administrator device includes:
      a location information acquisition unit configured to, in response to an input operation to start parking of the self-driving vehicle by the user via the mobile terminal device, acquire an instruction indicative of the input operation from the mobile terminal device and acquire location information indicative of a location of the self-driving vehicle from the self-driving vehicle;

a location determination unit configured to determine based on the location information, whether the self-driving vehicle indicated by the location information is within the getting-off area; and a driving setting unit configured to, based on the location information:

instruct the self-driving vehicle to start parking when the location information shows that the self-driving vehicle is within the getting-off area; and not instruct the self-driving vehicle to start parking when the location information shows that the self-driving vehicle is not within the getting-off area, wherein when the location information shows that the self-driving vehicle is not within the getting-off area, the administrator device waits for the instruction indicative of the input operation to be input again from the mobile terminal device, wherein:

the getting-off area includes a plurality of spaces, each space being a single area in which a single self-driving vehicle is parked; and the driving setting unit sets the guidance route from a present location of the self-driving vehicle located in one of the plurality of spaces provided in the getting-off area to the parking location.

2. The parking assist system according to claim 1, wherein the location determination unit is configured to determine whether the location of the self-driving vehicle is within a predetermined getting-off area where the user gets out of the vehicle.

3. The parking assist system according to claim 2, wherein the administrator device further includes a map transmission unit configured to transmit map information on the parking area to the self-driving vehicle, the self-driving vehicle further includes a location information transmission unit configured to receive the map information from the administrator device and to, subsequently, transmit location information of the self-driving vehicle to the administrator device, and the location information acquisition unit of the administrator device is configured to acquire the location information transmitted from the self-driving vehicle.

4. The parking assist system according to claim 3, wherein the map transmission unit of the administrator device is configured to transmit the map information to the self-driving vehicle when the user performs the input operation via the mobile terminal device.

5. The parking assist system according to claim 1, wherein the location information acquisition unit of the administrator device is configured to acquire locations of the self-driving vehicle and the mobile terminal device, and the location determination unit is configured to determine whether the location of the self-driving vehicle is within the getting-off area and whether the location of the mobile terminal device is within a waiting area outside of the getting-off area.

6. The parking assist system according to claim 5, wherein the location information acquisition unit is configured to repeatedly acquire locations of the self-driving vehicle and the mobile terminal device, the location determination unit is configured to repeatedly determine whether the location of the self-driving vehicle is within the getting-off area and whether the location of the mobile terminal device is within the waiting area outside of the getting-off area, and the driving setting unit is configured to:

wait until the mobile terminal device is located in the waiting area when the self-driving vehicle is located in the getting-off area and the mobile terminal device is not located in the waiting area; and instruct the self-driving vehicle to start parking when the mobile terminal device subsequently enters the waiting area.

7. The parking assist system according to claim 1, further comprising:

the getting-off area where the user gets out of the self-driving vehicle; and the parking location at which the self-driving vehicle is parked after automatically travelling from the getting-off area by self-driving, wherein the location information acquisition unit is configured to acquire a location of the mobile terminal device in response to inputting an auto-parking request for the self-driving vehicle by the user.

8. The parking assist system according to claim 7, wherein a waiting area is located a predetermined distance away from the getting-off area.

9. The parking assist system according to claim 8, wherein the waiting area is a pedestrian-only area.

10. The parking assist system according to claim 8, wherein the location information acquisition unit is further configured to acquire the location of the self-driving vehicle in response to inputting an auto-parking request for the self-driving vehicle by the user, and the location determination unit is configured to determine whether the location of the self-driving vehicle is within the getting-off area and whether the location of the mobile terminal device is within the waiting area.

11. The parking assist system according to claim 10, wherein the driving setting unit is configured to:

select the parking location for the self-driving vehicle and instruct the self-driving vehicle to start parking when the location determination unit determines that the location of the self-driving vehicle is within the getting-off area and that the location of the mobile terminal device is within the waiting area; and not instruct the self-driving vehicle to start parking when the location determination unit determines that the location of the self-driving vehicle is not within the getting-off area or that the location of the mobile terminal device is not within the waiting area.

12. The parking assist system according to claim 10, wherein the driving setting unit is configured to:

not instruct the self-driving vehicle to start parking until the mobile terminal device enters the waiting area when the location determination unit determines that the location of the self-driving vehicle is within the getting-off area but the location of the mobile terminal device is not within the waiting area; and instruct the self-driving vehicle to start parking when the mobile terminal device subsequently enters the waiting area.

13. The parking assist system according to claim 11, wherein the driving setting unit is configured to issue an instruction to start parking together with route information from the getting-off area to the parking location.

14. The parking assist system according to claim 1, wherein
the location information acquisition unit is configured to acquire location information indicative of a location of the mobile terminal device when the user performs the input operation via the mobile terminal device to start parking.

15. The parking assist system according to claim 1, further comprising:
the getting-off area where the user gets out of the self-driving vehicle; and
the parking location at which the self-driving vehicle is parked after automatically travelling from the getting-off area by self-driving, wherein
the location information acquisition unit is configured to acquire a location of the mobile terminal device in response to inputting an auto-parking request for the self-driving vehicle by the user, and
the location determination unit is configured to determine whether the location of the mobile terminal device is a waiting area located outside of the getting-off area.

16. The parking assist system according to claim 1, further comprising:
the getting-off area where the user gets out of the self-driving vehicle; and
the parking location at which the self-driving vehicle is parked after automatically travelling from the getting-off area by self-driving, wherein
the location information acquisition unit is configured to acquire a location of the mobile terminal device in response to inputting an auto-parking request for the self-driving vehicle by the user,
the location determination unit is configured to determine whether the location of the mobile terminal device is a waiting area located separate from the getting-off area, and
the waiting area is a pedestrian-only area.

17. The parking assist system according to claim 1, wherein
the driving setting unit transmits the guidance route to the self-driving vehicle stopped at the getting-off area as the parking start instruction which instructs the self-driving vehicle to start the parking.

18. The parking assist system according to claim 1, wherein
during the automatic driving from the getting-off area to the parking location, the self-driving vehicle travels along the guidance route without an occupant.

19. The parking assist system according to claim 1, wherein
the driving setting unit sets the guidance route after the location information acquisition unit has acquired the location information indicative of the location of the self-driving vehicle.

20. A parking assist system configured to assist vehicle parking, the system comprising:
a self-driving vehicle configured to perform automatic driving from a getting-off area in a parking area to a parking location in the parking area;
an administrator device configured to transmit a guidance route from the getting-off area to the parking location and a parking start instruction to the self-driving vehicle; and
a mobile terminal device configured to be held by a user of the self-driving vehicle and configured to communicate with the administrator device, wherein
the administrator device includes a computer programmed to:
in response to an input operation to start parking of the self-driving vehicle by the user via the mobile terminal device, acquire an instruction indicative of the input operation from the mobile terminal device and acquire location information indicative of a location of the self-driving vehicle from the self-driving vehicle;
determine based on the location information, whether the self-driving vehicle indicated by the location information is within the getting-off area;
instruct the self-driving vehicle to start parking when the location information shows that the self-driving vehicle is within the getting-off area; and
not instruct the self-driving vehicle to start parking when the location information shows that the self-driving vehicle is not within the getting-off area, wherein when the location information shows that the self-driving vehicle is not within the getting-off area, the administrator device waits for the instruction indicative of the input operation to be input again from the mobile terminal device,
wherein:
the getting-off area includes a plurality of spaces, each space being a single area in which a single self-driving vehicle is parked; and
the computer is further programmed to set the guidance route from a present location of the self-driving vehicle located in one of the plurality of spaces provided in the getting-off area to the parking location.

* * * * *